(12) United States Patent
Calvin (10) Patent No.: US 10,005,403 B2
(45) Date of Patent: Jun. 26, 2018

(54) ROOF RACK SYSTEM

(71) Applicant: Bryce A. Calvin, West Jordan, UT (US)

(72) Inventor: Bryce A. Calvin, West Jordan, UT (US)

(73) Assignee: TERAFLEX, INC., West Jordan, UT (US)

(*) Notice: Subject to any disclaimer, the term of this patent is extended or adjusted under 35 U.S.C. 154(b) by 453 days.

(21) Appl. No.: 14/929,095

(22) Filed: Oct. 30, 2015

(65) Prior Publication Data
US 2017/0120836 A1   May 4, 2017

(51) Int. Cl.
*B60R 9/04* (2006.01)
*B60R 9/00* (2006.01)
*B60R 9/058* (2006.01)
*B60J 7/10* (2006.01)

(52) U.S. Cl.
CPC .............. *B60R 9/058* (2013.01); *B60J 7/106* (2013.01)

(58) Field of Classification Search
CPC ... B60R 9/058; B60R 9/04; B60R 9/00; B60J 7/106
USPC ........................................ 224/326, 325, 309
See application file for complete search history.

(56) References Cited

U.S. PATENT DOCUMENTS

| | | | |
|---|---|---|---|
| D324,196 S * | 2/1992 | Muth | D12/404 |
| 5,497,925 A * | 3/1996 | Lumpe | B60R 9/04 |
| | | | 224/309 |
| 5,699,944 A * | 12/1997 | Duran | B60R 9/04 |
| | | | 224/309 |
| 5,979,723 A | 11/1999 | Tress | |
| 6,158,637 A * | 12/2000 | Fisch | B60R 9/04 |
| | | | 224/309 |
| 6,257,261 B1 | 7/2001 | Johnson | |

(Continued)

FOREIGN PATENT DOCUMENTS

| | | |
|---|---|---|
| EP | 2174836 A1 * | 4/2010 |
| WO | 2015/085431 A1 | 6/2015 |

OTHER PUBLICATIONS

"BMW Roof Rack Base Support System 3 Series Sedan & Coupe (1999-2005)," Sep. 24, 2015, Amazon.com, <http://www.amazon.com/BMW-Support-System-Sedan-2006-2011/dp/B001N3B3OA> [retrieved Sep. 24, 2015], 6 pages.

(Continued)

*Primary Examiner* — Nathan J Newhouse
*Assistant Examiner* — Lester L Vanterpool
(74) *Attorney, Agent, or Firm* — Christensen O'Connor Johnson Kindness PLLC (57) ABSTRACT

Generally described, aspects of the disclosed subject matter are directed to systems and method of attaching a roof rack to a vehicle having a removable hard top and a space frame. In accordance with aspects of the present disclosure, the roof rack generally includes an elongate rail, an upper mounting pad, a lower mounting pad, and fasteners which couple the elongate rail to the vehicle. During assembly of the roof rack components, a main fastener is captured by the geometry of the components. The main fastener is used to couple the roof rack assembly to a bracket mounted to the space frame of the vehicle. In this regard, various loads acting on the roof rack are generally transferred to the space frame as opposed to the vehicle hardtop.

20 Claims, 7 Drawing Sheets

(56) References Cited

U.S. PATENT DOCUMENTS

| | | | |
|---|---|---|---|
| 6,267,281 B1 * | 7/2001 | Nerling | B60R 9/04 224/309 |
| 6,283,531 B1 * | 9/2001 | Tanigawa | B60J 7/106 296/103 |
| 6,309,007 B1 * | 10/2001 | Essig | B60J 7/106 296/102 |
| 6,350,095 B1 | 2/2002 | Gross | |
| 6,378,747 B1 * | 4/2002 | Fisch | B60R 9/04 224/309 |
| 6,561,397 B1 * | 5/2003 | Bauer | B60R 9/04 224/316 |
| 6,921,077 B1 * | 7/2005 | Pupo | B60J 7/106 296/102 |
| 7,182,233 B1 * | 2/2007 | Graffy | B60R 9/04 224/309 |
| 7,204,396 B1 * | 4/2007 | Stapleton | B60R 9/04 224/309 |
| 7,845,528 B2 | 12/2010 | McMillan | |
| 7,866,516 B2 * | 1/2011 | Binder | B60R 9/04 224/309 |
| 7,980,437 B2 | 7/2011 | Binder | |
| 8,123,091 B2 * | 2/2012 | Kiyota | B60R 9/04 224/309 |
| 8,123,287 B2 | 2/2012 | Fuchs | |
| 8,132,701 B2 | 3/2012 | Verhelst | |
| 8,523,032 B2 | 9/2013 | Neidlein | |
| 8,678,257 B2 | 3/2014 | Huhn | |
| 8,720,761 B2 * | 5/2014 | Binder | B60R 9/04 224/309 |
| 8,789,732 B2 | 7/2014 | Aftanas | |
| 8,814,014 B2 * | 8/2014 | Bocker | B60R 9/04 224/309 |
| 8,864,165 B2 | 10/2014 | Thomas | |
| 2003/0178458 A1 * | 9/2003 | Trambley | B60R 9/04 224/326 |
| 2004/0155479 A1 * | 8/2004 | Willard | B60J 1/1815 296/107.01 |
| 2005/0095102 A1 | 5/2005 | Watson | |
| 2006/0226188 A1 * | 10/2006 | Smith | B60R 9/04 224/326 |
| 2007/0194069 A1 * | 8/2007 | Binder | B60R 9/04 224/326 |
| 2008/0100089 A1 * | 5/2008 | Schumacher | B60J 7/106 296/107.17 |
| 2013/0015218 A1 | 1/2013 | Surkin | |
| 2013/0299539 A1 * | 11/2013 | Bocker | B60R 9/00 224/309 |
| 2014/0069971 A1 | 3/2014 | van Kaathoven | |
| 2014/0131406 A1 * | 5/2014 | Jutila | B60R 9/058 224/321 |
| 2015/0123422 A1 | 5/2015 | Bennett | |

OTHER PUBLICATIONS

"Yakima 54 Inch Track Hardtop Kit," Sep. 24, 2015, Rack Attack, Product Code 201614, <http://www.rackattack.com/product-pages/yakima-54-inch-track-hardtop-kit.asp> [retrieved Sep. 24, 2015], 2 pages.

* cited by examiner

ROOF RACK SYSTEM

BACKGROUND

A roof rack system for a vehicle, alternatively referred to as a cargo carrier, provides an alternate location to transport objects aside from the cabin. A roof rack may be used to transport objects too large to fit within the cabin (e.g., a kayak or surfboard); objects which could soil or otherwise harm the interior (e.g. a mountain bike, snow sports equipment, or a fuel canister); and/or provide additional storage by mounting a cargo basket or enclosed box. The versatility of a roof rack system provides the user a flexible cargo transport system outside the cabin that can optionally be removed from the vehicle when not in use.

A roof rack system typically includes roof rails that transfer loading of the cargo and the system itself directly to the space frame of the vehicle. In this regard, many roof rack systems include mounting assemblies that directly tie into the structure of the vehicle's space frame. Some vehicles have integral roof rack rails as part of their Original Equipment Manufacturer's (OEM) offering. To provide mounting and/or securing locations for various cargo, many systems include crossbars that extend between the roof rails. The crossbars combine with the roof rails to provide a system capable of carrying cargo by transferring the loads through the vehicle's space frame.

A unique design challenge exists to provide roof rack systems for vehicles with removable hardtops, such as a variety of offerings by the OEM, JEEP®. One exemplary offering by JEEP® with a removable hardtop is the "JK" series of the "Wrangler" model. In this configuration, a conventional roof rack system installed with the hard top must be removed prior to the removal of the hard top. Likewise, conventional systems often require extensive permanent modification of the hard top, space frame, and or OEM mounting brackets.

Therefore, a need exists for an improved roof rack system for mounting to vehicles with removable hardtops, which minimizes impact to the convenience of removing the hardtop from the vehicle and requires less intrusive modification of the hardtop, space frame, and OEM mounting brackets. Embodiments of the present disclosure are directed to fulfilling these and other needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a cargo carrier for a vehicle having a removable hardtop and a space frame is provided. The cargo carrier generally includes an elongate rail including an attachment point and an access hole; an upper mounting pad configured to interface the elongate rail at the attachment point and to interface an upper surface of the removable hardtop; a lower mounting pad configured to interface a lower surface of the removable hardtop; a bracket removably coupled to the space frame and configured to interface the lower mounting pad; and a fastener coupled to the upper mounting pad, the lower mounting pad, and the bracket, wherein the removable hardtop is positioned between the upper mounting pad and the lower mounting pad, and wherein the elongate rail is removably coupled to the upper mounting pad, to capture the fastener, the captured fastener being accessible through the access hole to selectively mount the cargo carrier to the vehicle.

In accordance with another embodiment of the present disclosure, a roof rack system for a vehicle having a removable hardtop and a space frame is provided. The roof rack system generally includes a first elongate rail positioned near a first edge of the removable hardtop, the first elongate rail including a first forward access hole, and a first rear access hole; a second elongate rail positioned near a second edge of the removable hardtop, the second elongate rail including a second forward access hole, and a second rear access hole; a first forward upper mounting pad and a first rear upper mounting pad configured to couple the first elongate rail in an elevated position relative to the removable hardtop; a second forward upper mounting pad and a second rear upper mounting pad configured to couple the second elongate rail in an elevated position relative to the removable hardtop; a first forward bracket and a first rear bracket removably coupled to the space frame, the first forward bracket and the first rear bracket configured to couple the first elongate rail to the vehicle space frame; and a second forward bracket and a second rear bracket removably coupled to the space frame, the second forward bracket and the second rear bracket configured to couple the second elongate rail to the vehicle space frame, wherein the roof rack system is configured to be removed with the vehicle hardtop without removing the roof rack system from the vehicle hardtop, and wherein the access holes in the first elongate rail and the second elongate rail allow access to a captured fastener for assembly and removal of the vehicle hardtop.

In accordance with another embodiment of the present disclosure, a method of assembling a cargo carrier for a vehicle having a removable hardtop and a space frame is provided. The method generally includes obtaining an elongate rail having an attachment point, an upper mounting pad having a first alignment point, a main fastener, a lower mounting pad having a second alignment point, and a pad fastener; inserting the main fastener in a cavity in the upper mounting pad; positioning the attachment point of the elongate rail on the upper mounting pad in contact with an upper surface of the removable hardtop; positioning the lower mounting pad in contact with a lower surface of the removable hardtop; aligning the first alignment point with the second alignment point; and inserting the pad fastener through the lower mounting pad, the vehicle hardtop, the upper mounting pad, such that the pad fastener is coupled to the elongate rail, wherein, upon completing the steps, a head of the main fastener is captured between the elongate rail and the upper mounting pad.

In accordance with any of the embodiments described herein, the cargo carrier may further include a crossbeam coupled to the elongate rail and configured to carry cargo.

In accordance with any of the embodiments described herein, the captured fastener may be accessed with a tool through the access hole.

In accordance with any of the embodiments described herein, the cargo carrier may further include a cap configured to cover the end of the elongate rail and the upper mounting pad, wherein the cap is coupled to the elongate rail.

In accordance with any of the embodiments described herein, the cap may be coupled to the upper mounting pad.

In accordance with any of the embodiments described herein, the removable hardtop may further include a plurality of hardtop fasteners to couple the removable hardtop to the vehicle, each hardtop fastener having a tool interaction size, wherein the captured fastener is configured to have the tool interaction size of the plurality of hardtop fasteners such that a tool interchangeably interfaces both the captured fastener and the plurality of hardtop fasteners.

In accordance with any of the embodiments described herein, the bracket may further include a nut plate configured to receive the fastener.

In accordance with any of the embodiments described herein, the cargo carrier may further include a seal positioned between the upper mounting pad and the upper surface of the vehicle hardtop for preventing water intrusion.

In accordance with any of the embodiments described herein, the cargo carrier may further include a seal positioned between the lower mounting pad and the lower surface of the vehicle hardtop for preventing water intrusion.

In accordance with any of the embodiments described herein, the roof rack system may further include a crossbeam coupled to the first elongate rail and the second elongate rail, the crossbeam configured to carry cargo.

In accordance with any of the embodiments described herein, the roof rack system may further include a forward cap and a rear cap configured to cover the ends of the first elongate rail.

In accordance with any of the embodiments described herein, the roof rack system may further include a forward cap and a rear cap configured to cover the ends of the second elongate rail.

In accordance with any of the embodiments described herein, the roof rack system may further include a first forward seal positioned between the first forward upper mounting pad and the upper surface of the vehicle hardtop, and a first rear seal positioned between the first rear upper mounting pad and the upper surface of the vehicle for preventing water intrusion In accordance with any of the embodiments described herein, the roof rack system may further include a second forward seal positioned between the second forward upper mounting pad and the upper surface of the vehicle hardtop, and a second rear seal positioned between the second rear upper mounting pad and the upper surface of the vehicle for preventing water intrusion In accordance with any of the embodiments described herein, the first elongate rail and the second elongate rail are parallel and positioned in the direction of straight vehicle travel.

In accordance with any of the embodiments described herein, the method may further include the steps of: coupling a bracket to the space frame; aligning the vehicle hardtop on the space frame; and inserting the main fastener through a nut plate coupled to the bracket, such that the main fastener is coupled to the space frame, thereby coupling the cargo carrier and the removable hardtop to the vehicle.

In accordance with any of the embodiments described herein, the method may further include the step of lifting the removable hardtop with a hoist attached to the elongate rail.

In accordance with any of the embodiments described herein, the method may further include the step of obtaining a tool for rotating the main fastener, wherein the tool is sized to interface a hardtop fastener configured to couple the hardtop to the vehicle.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Likewise, unless otherwise noted, any steps described herein are not limited to a particular order, such that steps may be rearranged in some instances to achieve the same or substantially similar result.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number.

The vehicle manufacturer, JEEP®, and the series/model designations, "JK" and "Wrangler," are used throughout the present disclosure for ease of discussion to refer to a model of vehicle typically having a removable hardtop. In some embodiments, the roof rack system of the present disclosure is mounted to a JEEP® JK-series Wrangler; however, vehicles with hardtops suitable for use with the roof rack system of the present disclosure are not limited to this example vehicle, but also include hardtops for vehicles of a variety of other manufacturers, makes and models.

Embodiments of the present disclosure are generally directed to roof rack systems (i.e., cargo carriers) for use with vehicles having hardtop configurations. Embodiments of the roof rack systems disclosed herein are suitable to carry a variety of loads on the roof of the vehicle (e.g., bicycles, kayaks, snow sports equipment, luggage, tools, spare wheels, fuel/liquid canisters, etc.). Embodiments disclosed herein use symmetry, where applicable, for clarity and convenience; however, the use of symmetry (e.g., left to right, front and rear, and/or top and bottom, etc.) should not be construed as limiting the scope of the disclosure to symmetric parts, as the present disclosure also contemplates "handed" parts in locations where symmetric parts are illustrated and described. Likewise, the use of "left" or "right" refer to the directions to either side when a user is facing the direction of straight travel of the vehicle (i.e., when the vehicle's steering wheel is in the neutral position).

In one embodiment, the roof rack system generally includes two side rails near the left and right sides of the roof of the vehicle, where the side rails are positioned lengthwise in the direction of straight vehicle travel. The side rail assemblies are configured to attach to the vehicle and transfer the load of the cargo to the space frame of the vehicle. In certain embodiments disclosed herein, the rail assemblies are joined using a crossbeam that ties a first rail assembly to a second rail assembly on the opposite side of the vehicle, e.g., the left hand side and the right hand side. In further embodiments, more than one crossbeam may be used as needed to provide mounting locations or added support surface area for carrying the cargo. In some embodiments, the cargo is placed solely on the crossbeams, which then transfer the loading to the side rails and through the mounting areas to the space frame of the vehicle. In other embodiments, the cargo is placed solely on the side rails or a combination of the side rails and the crossbeams. In further embodiments, the roof rack system of the present disclosure is configured to support any suitable loading configuration of the cargo.

Figure 1:
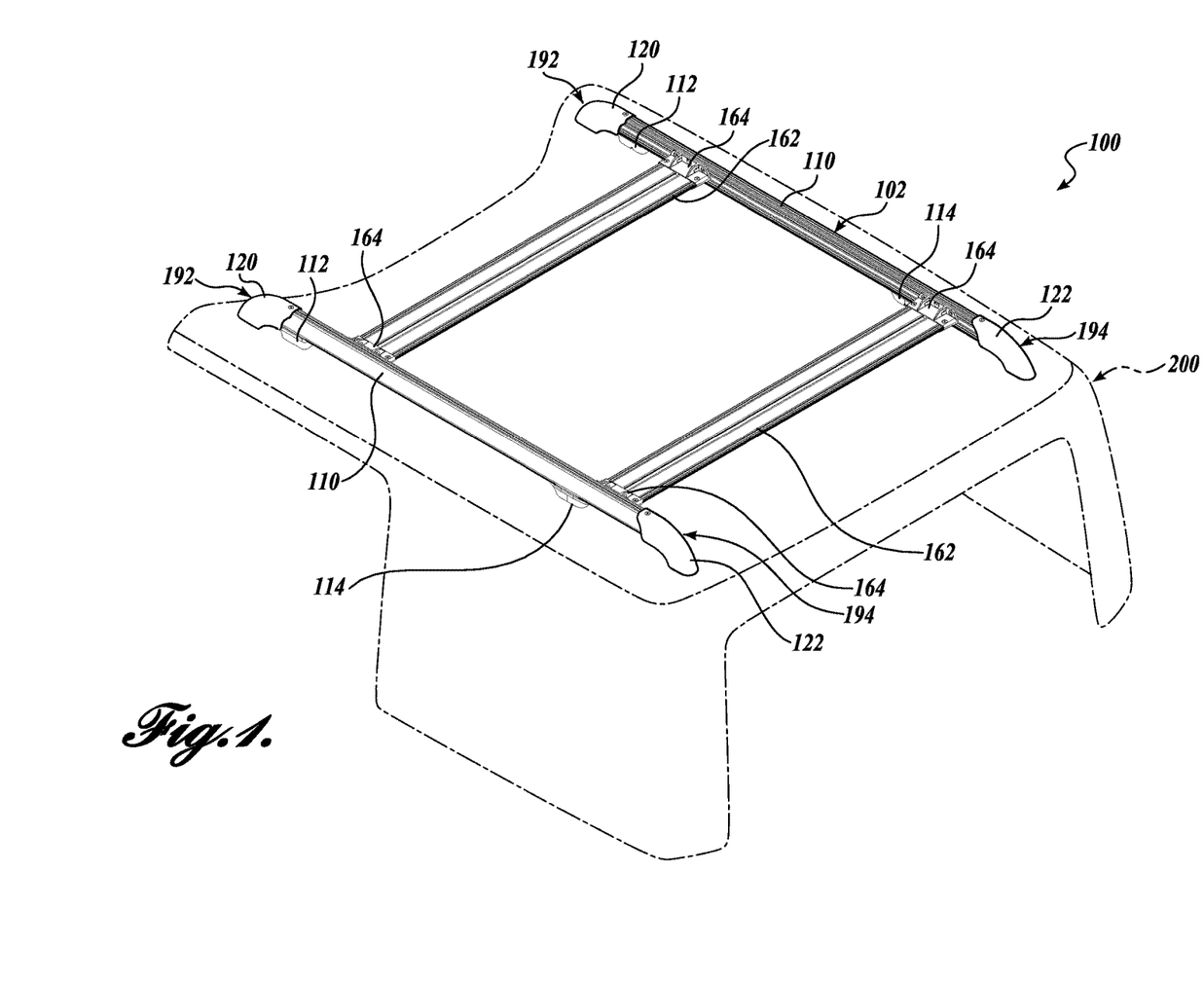
FIG. 1 is a rear left top isometric view of one representative embodiment of a roof rack system in accordance with an aspect of the present disclosure, showing the roof rack system assembled to a vehicle hardtop.

Referring now to FIGS. 1-4, there is shown one embodiment of a roof rack system 102 removably coupled to a vehicle hardtop 200, the assembled combination generally designated 100, in accordance with one or more aspects of the present disclosure. The assembled combination 100, as shown in FIG. 1, is removed from the vehicle as an assembly for convenience to the user such that the roof rack system 102 is also removed during typical removal of the vehicle hardtop 200. One beneficial aspect of the present disclosure is the ability to use the components of the roof rack system 102 as lifting points to hoist the assembled combination 100, allowing removal of the vehicle hardtop 200 with greater ease. When assembled to the vehicle 500 the assembled combination 100 directs loads from the cargo carried by the roof rack system 102 to a vehicle space frame 300. In embodiments of the present disclosure, an additional panel assembly 400 is removed and replaced without disturbing the assembled combination 100. The OEM for the particular depicted model of vehicle often refers to the additional panel assembly 400 as "freedom panels," or FREEDOM TOP®. In other embodiments, the panel assembly 400 is integral with the vehicle hardtop 200 and is removed in conjunction with the assembled combination 100. In further embodiments, the panel assembly 400 is omitted from the vehicle without affecting the operation of the present disclosure, as described herein.

Figure 4:
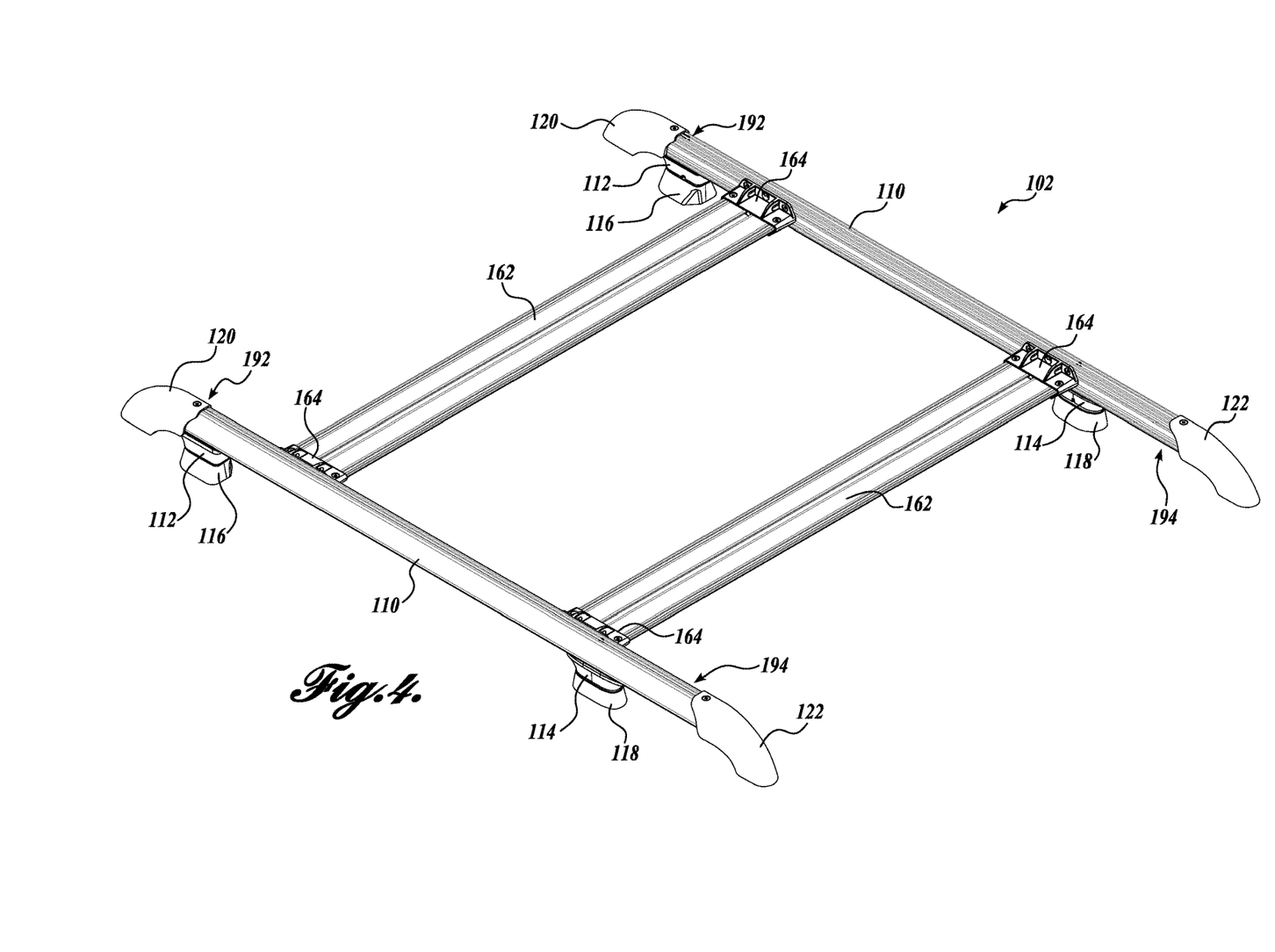
FIG. 4 is a rear left top isometric view of the roof rack system of FIG. 1.

Now referring to FIGS. 1 and 4, the roof rack assembly 102 of the assembled combination 100 will be described in more detail. FIG. 1 illustrates one embodiment of the assembled combination 100 including the roof rack system 102 in accordance with one aspect of the present disclosure. FIG. 4 isolates the roof rack system 102 for greater clarity of the components and assembly. The roof rack system 102 includes a side rail 110, a front upper mounting pad 112, a rear upper mounting pad 114, a front cap 120, and a rear cap 122. In the illustrated embodiment, there is a side rail 110 assembled to each side of the vehicle hardtop 200 and aligned longitudinally in the direction of straight vehicle travel. Each side rail 110 is supported by a front mount assembly 192 and a rear mount assembly 194. In other embodiments, the rails are aligned in any suitable direction to provide mounting configurations for the cargo carried by the roof rack system 102. The front upper mounting pad 112 and the rear upper mounting pad 114 support the side rail 110 in an elevated position from the top surface of the vehicle hardtop 200. In this regard, the elevated position provided by the front upper mounting pad 112 and the rear upper mounting pad 114 is any suitable elevation that provides the desired clearance from the vehicle hardtop 200, stability, and other applicable design considerations. As will be described in greater detail below, the front upper mounting pad 112 has a complementary front lower mounting pad 116 that encloses the skin of the vehicle hardtop 200 between the mounting pads 112 and 116. Likewise, the rear upper mounting pad 114 has a complementary rear lower mounting pad 118. The front cap 120 and the rear cap 122 enhance aerodynamic effects of the roof rack system 102, cover sharp edges of the side rail 110 to protect cargo and the user, and provide an aesthetically finished appearance for the roof rack system 102.

In one embodiment of the present disclosure, the roof rack system 102 optionally includes one or more crossbeams 162 to join multiple side rails 110 for increased stability of the roof rack system 102, to provide mounting locations for cargo carrying accessories (not shown), for increased surface area support of larger cargo items, and/or any other suitable purpose. One embodiment of the crossbeam 162 is mounted to the side rail 110 using a crossbeam bracket 164 at each interface location. The crossbeam bracket 164 is coupled to the side rail 110 using a t-nut (not shown) in either an upper side t-slot 186 or a lower side t-slot 188 (see FIG. 5). The use of t-nuts is explained in further detail below. The side rails 110 include mounting slots (described below) that allow for adjustment of the location along the length of the side rail 110 at which each crossbeam 162 is mounted. In the illustrated embodiment, a single crossbeam 162 is mounted to two side rails 110 using two crossbeam brackets 164. The fasteners used in the mounting scheme of the crossbeam 162 to the side rail 110 are well known in the art and are not shown in detail in the FIGURES for clarity purposes. In the illustrated embodiments of FIGS. 1 and 4, the roof rack system 102 is pictured with two crossbeams 162 having four crossbeam brackets 164. In further embodiments, the roof rack system 102 includes a single crossbeam 162 or more than two crossbeams 162. However, in other embodiments, the crossbeams 162 and crossbeam brackets 164 can be omitted from the roof rack system 102 while maintaining the features and advantages of the present disclosure. For example, omission of the crossbeams 162 may be desirable if the roof rack system 102 has cargo loaded with a forklift or other bottom-loading device (not shown) with supports that must be removed after the load of the cargo is resting on the side rails 110 of the roof rack system 102.

Figure 2:
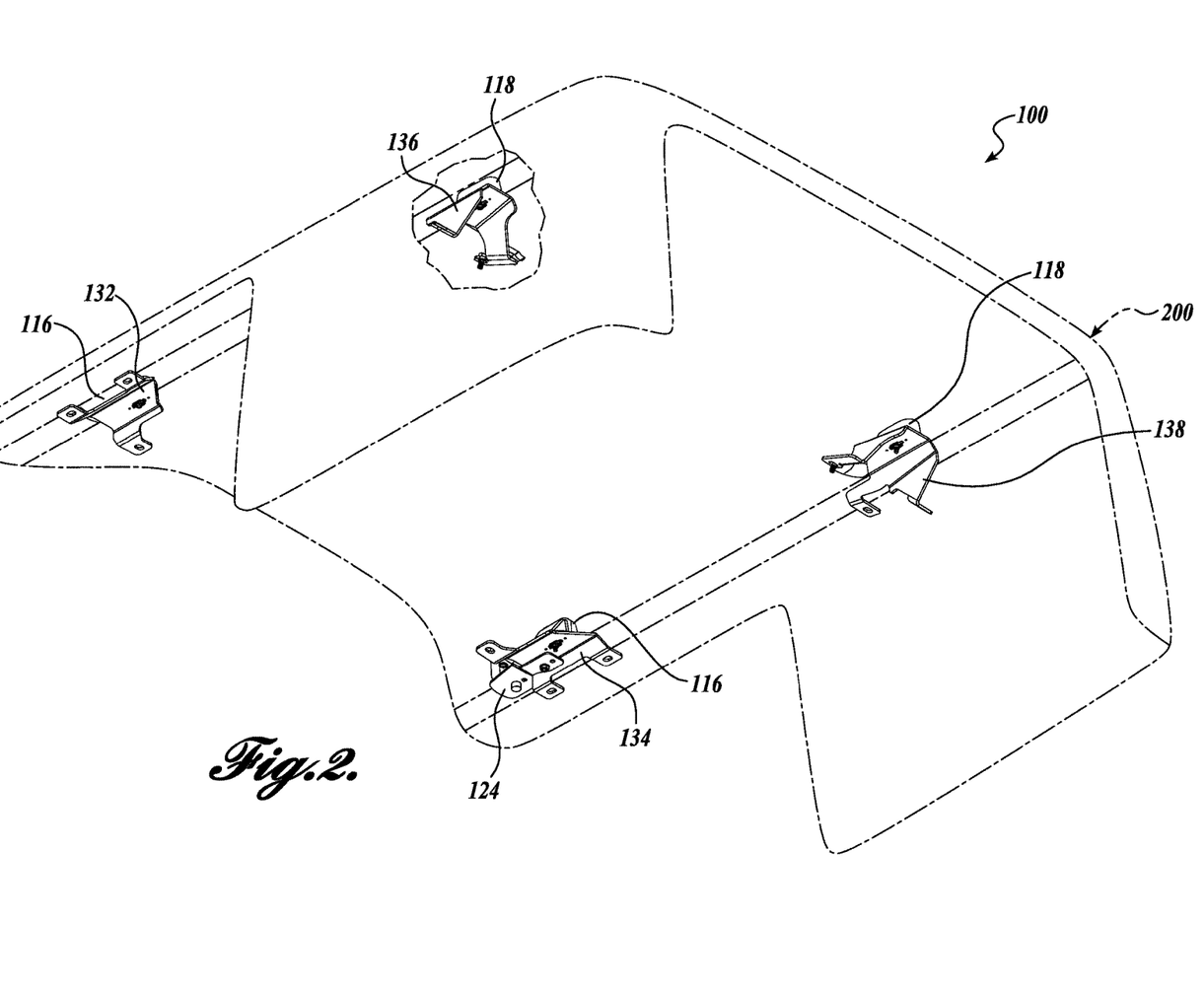
FIG. 2 is a rear left bottom isometric view of the roof rack system of FIG. 1 assembled to the vehicle hardtop.
Figure 3:
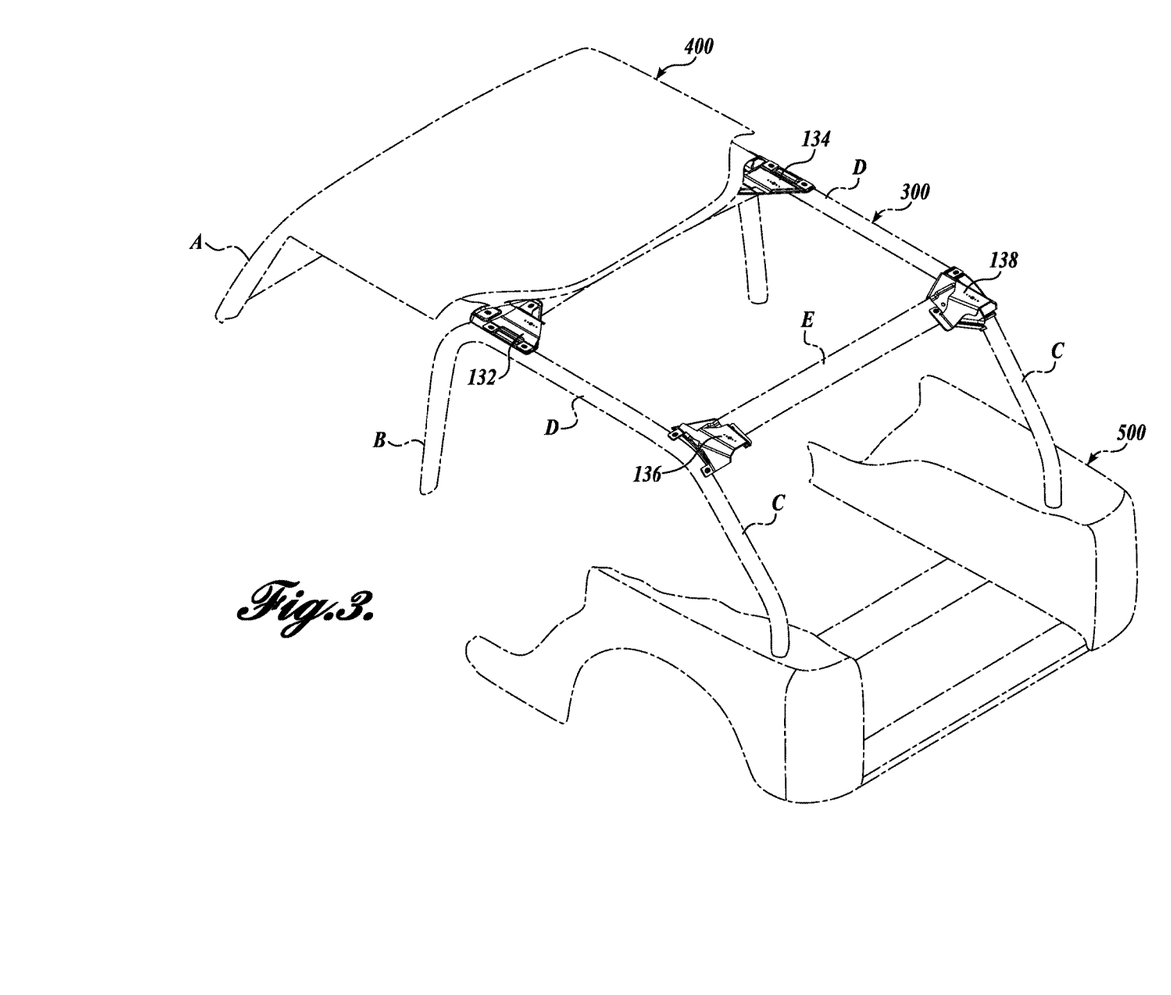
FIG. 3 is a rear left top isometric view of one representative embodiment of a space frame of a vehicle in accordance with an aspect of the present disclosure, showing mounting brackets of the roof rack system of FIG. 1.

Now turning to FIGS. 2 and 3, the mounting scheme of the roof rack system 102 to the vehicle space frame 300 is shown in more detail. As illustrated most clearly in FIG. 3, the vehicle space frame 300 is shown with representative frame segments, including a forward pillar A, an intermediate pillar B, a rear pillar C, a longitudinal segment D, and a lateral segment E. Embodiments of the present disclosure mount the roof rack system 102 to the vehicle space frame 300 using brackets attached to various locations on the vehicle space frame 300.

As shown in FIGS. 2 and 3, four brackets are used to mount the roof rack system 102 to the vehicle space frame 300. However, in other embodiments, any suitable number of brackets is used to mount the roof rack system 102 to the vehicle space frame 300. Returning to the illustrated embodiment, the brackets include a forward left bracket 132, a forward right bracket 134, a rear left bracket 136, and a rear right bracket 138. The forward mounting brackets 132 and 134 are attached to the vehicle space frame 300 at the intersection of the intermediate pillars B and the longitudinal segments D. Likewise, the rear mounting brackets 136 and 138 are attached to the vehicle space frame 300 at the intersection of the rear pillars C, the longitudinal segments D, and the lateral segment E. In this regard, the mounting brackets 132, 134, 136, and 138 provide a loading path from the roof rack system 102 to the vehicle space frame 300 to carry the load of the cargo. In some embodiments, the mounting brackets 132, 134, 136, and 138 attach to the vehicle space frame 300 with fasteners (not shown) using existing holes in the vehicle space frame 300. In other embodiments, any suitable mounting device is utilized to attach the mounting brackets 132, 134, 136, and 138 to the vehicle space frame 300. The mounting of the assembled combination 100 to the mounting brackets 132, 134, 136, and 138 will be described in greater detail below.

In some embodiments, additional brackets are used to provide a mounting location for the front and rear caps 120 and 122, shown, for example, as a front cap bracket 124 in FIG. 2. As can also be seen most clearly in FIG. 2, the assembled combination 100 interfaces the brackets 132, 134, 136, and 138 through the front lower mounting pad 116 and the rear lower mounting pad 118. The dimensions for the height of the lower mounting pads 116 and 118 is adjusted to fill the space between the brackets 132, 134, 136, and 138 and the skin of the vehicle hardtop 200. In this regard, when the roof rack system 102 and the vehicle hardtop 200 are attached to the vehicle space frame 300, loading in all directions from the cargo on the roof rack system 102 is transferred to the vehicle space frame 300 rather than deforming the skin of the vehicle hardtop 200.

Figure 5:
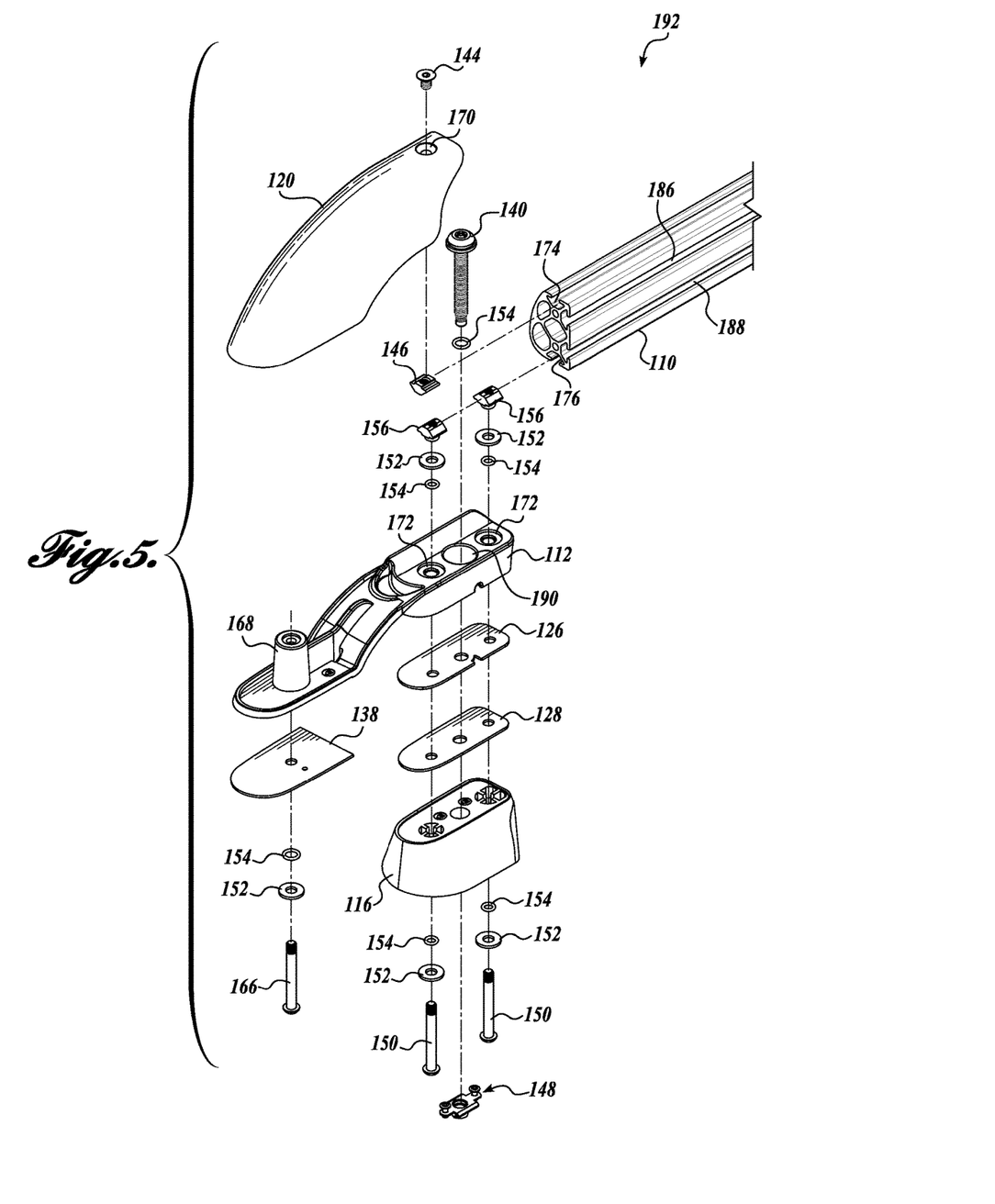
FIG. 5 is an exploded front left top isometric view of a front mounting location of the roof rack system of FIG. 1.
Figure 6:
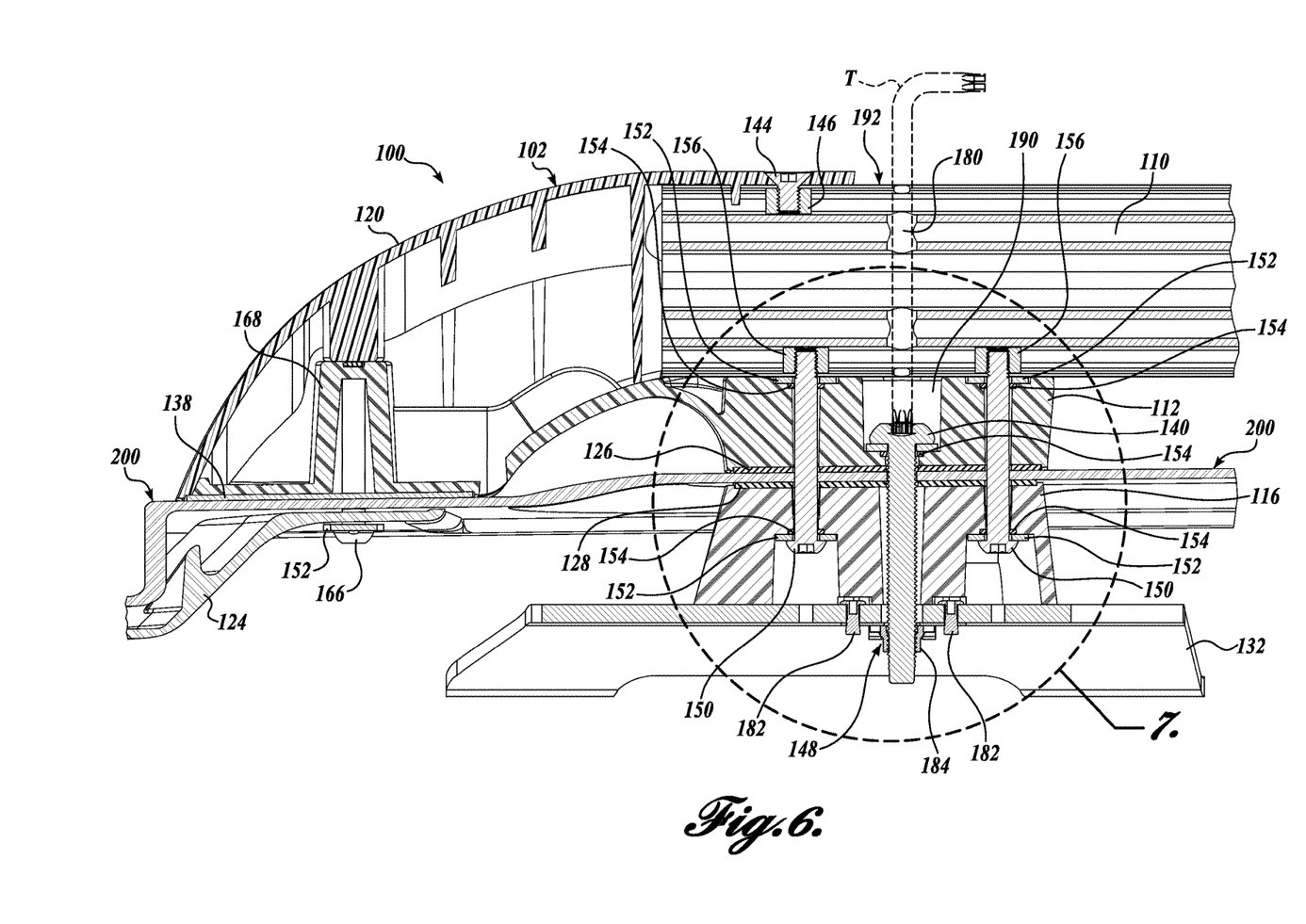
FIG. 6 is a left cross-sectional view of the front mounting location of FIG. 5.

Now referring to FIG. 5, the front mount assembly 192 of the roof rack system 102 to the vehicle hardtop 200 is shown in exploded view. Although a single assembly location is illustrated, the other assembly locations, including the rear mount assemblies 194, are similar in components and assembly methods. In the illustrated embodiment, the side rail 110 includes four t-slots: an upper t-slot 174; a lower t-slot 176; the upper side t-slot 186; and the lower side t-slot 188. During assembly, an upper t-nut 146 is inserted into the upper t-slot 174, and a lower t-nut 156 is inserted into the lower t-slot 176. The t-nuts 146 and 156 are generally referred to as "blind fasteners," as they accept a threaded screw or bolt without the need to be held with a tool to keep from spinning during tightening of the screw or bolt. Although not illustrated, in some embodiments, similar t-nuts to 146 and 156 are used in the upper side t-slot 186 and/or the lower side t-slot 188 to attach the crossbeam 162 to the side rail 110. The t-nuts 146 and 156 can be positioned at any location within the t-slots 174 to provide adjustability in the position of the components assembled to the side rail 110. Once secured, the t-nuts 146 and 156 retain their position within the t-slots 174 and 176 such that the component does not move within the slots with respect to the side rail 110. As an illustrative example, FIG. 6 shows one example of assembled positions of t-nuts 146 and 156 in the t-slots 174 and 176 in accordance with one embodiment of the present disclosure. In other embodiments, any suitable fastening method is used to assemble the components described herein to the side rail 110.

As shown, the front cap 120 is coupled to the side rail 110 using the upper t-nut 146 within the upper t-slot 174, and a cap fastener 144 from the top, which fits within a countersunk hole 170 in the front cap 120. The front cap 120 covers and protects the components and surfaces of the front upper mounting pad 112 and interfaces with the elevated boss 168 for support of the forward portion of the top cap 120. To connect the components, a forward cap fastener 166 is inserted from the bottom through the front cap bracket 124, the elevated boss 168 of the front upper mounting pad 112, and into a threaded hole (not shown) within the front cap 120. The forward cap fastener 166 is inserted using a washer 152 and an o-ring 154 near the head of the forward cap fastener 166. Throughout this disclosure, washers and o-rings are designated with the same numbers for simplicity; however, different types and sizes of washers and o-rings may be used as required for the embodiments of this disclosure.

Additionally, a forward sealing pad 196 is positioned between the front upper mounting pad 112 and the upper surface of the vehicle hardtop 200 during assembly. The forward sealing pad 196 and the o-ring 154 together provide sealing points to prevent water intrusion within the occupant cabin of the vehicle. In other embodiments, the sealing effect of the forward sealing pad 196 and the o-ring 154 is provided by any suitable method, including a thread sealant on the fastener and/or a sealing material (e.g., silicone) applied to the components.

Still referring to FIG. 5, the side rail 110 is mounted to the front upper mounting pad 112 using a lower pad fastener 150. The lower pad fasteners 150 are inserted from the bottom through the front lower mounting pad 116, the front upper mounting pad 112, and into the t-nuts 156 within the lower t-slot 176 of the side rail 110. As with the previous assembly using the forward cap fastener 166, the lower pad fasteners 150 are each assembled with a washer 152 and an o-ring 154 near the head of each lower pad fastener 150. At the end of the lower pad fastener 150 opposite the head, the t-nuts 156 are also inserted interfacing a washer 152 and an o-ring 154, which each fit within a countersunk mounting pad hole 172 in the front upper mounting pad 112.

Each mounting pad 112 and 116 includes a sealing pad where the mounting pads interface the surfaces of the vehicle hardtop 200. The front upper mounting pad 112 includes an upper sealing pad 126 positioned between the front upper mounting pad 112 and the upper surface of the vehicle hardtop 200 during assembly. Additionally, a lower sealing pad 128 is positioned between the front lower mounting pad 116 and the lower surface of the vehicle hardtop 200 during assembly. As previously noted, the sealing effect of the upper and lower sealing pads 126 and 128 and the o-rings 154 can be provided by any suitable method, including a thread sealant and/or a sealing material (e.g., silicone) applied to the components. In some embodiments, the sealing pads 126, 128, and 138, are manufactured from a material, such as rubber, that deforms under compression to fill surface irregularities and gaps, thereby providing a water barrier. However, in other embodiments, the sealing pads 126, 128, and 138 are manufactured using any suitable material.

By completing the foregoing assemblies as shown in FIG. 5 at each end of the side rail 110, at the front mount assemblies 192 and the rear mount assemblies 194, the roof rack system 102 is now securely attached to the vehicle hardtop 200 and ready for assembly to the vehicle as assembled combination 100. In addition to the OEM mounting locations for securing the vehicle hardtop 200, the roof rack system 102 includes a main fastener 140 to attach the roof rack system 102 directly to the brackets 132, 134, 136, and 138, which are mounted to the vehicle space frame 300. The main fastener 140 is assembled through a cavity 190 in the front upper mounting pad 112, the front lower mounting pad 116, and into a nut plate 148 attached to the brackets 132, 134, 136, and 138. Upon assembly of the front mount assembly 192, the head of the main fastener 140 is contained within the cavity 190 such that it cannot be removed without disassembly of the roof rack system 102 from the vehicle hardtop 200. In this regard, the main fastener 140 is a "captured fastener" that can be accessed during installation or removal of the assembled combination 100, as explained in further detail below.

Figure 7:
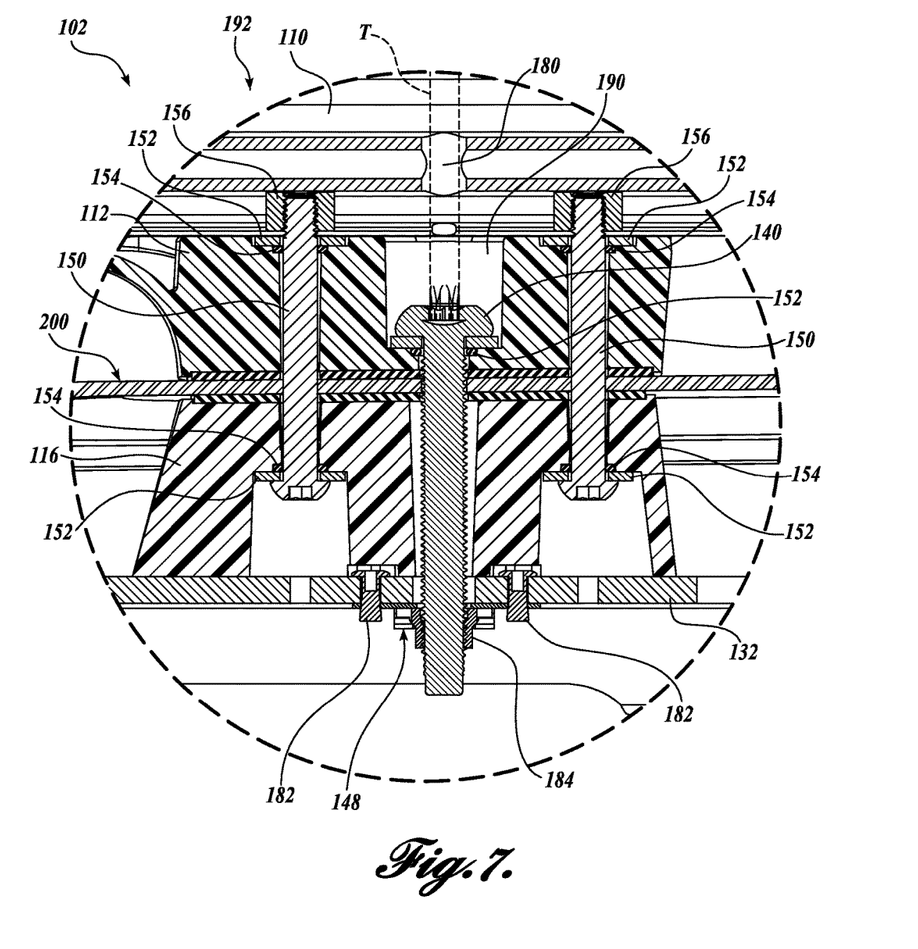
FIG. 7 is a partial cross-sectional view of the front mounting location of FIG. 6.

As can be seen most clearly in the assembled view of FIG. 6 and the detail view of FIG. 7, the main fastener 140 is assembled with an o-ring 154 to prevent water intrusion within the occupant cabin of the vehicle. In the illustrated embodiment, the main fastener 140 has an integral washer; however, in other embodiments, the main fastener 140 is assembled in conjunction with a separate washer (not shown). The nut plate 148 is secured to the brackets 132, 134, 136, and 138 with rivets 182, which hold the nut 184 in position to accept the main fastener 140 upon assembly. However, in other embodiments, the nut 184 is held in position using any suitable coupling. In some embodiments, the main fastener 140 has features to enhance alignment of the tip of the main fastener 140 within the threaded portion of the nut 184 and to prevent cross-threading. One commercial example of this type of tip is called "MAThread"; however, any equivalent feature is also suitable for use with the present disclosure. Likewise, the alignment enhancing features may be omitted from the main fastener 140 while still maintaining the advantages of the present disclosure.

As shown in FIGS. 6 and 7, when the side rail 110 is assembled to the front upper and lower mounting pads 112 and 116, the head of the main fastener 140 is captured within the cavity 190 such that the main fastener 140 is not misplaced during removal and assembly of the assembled combination 100. The main fastener 140 is captured within the cavity 190 due to the sizing of an access hole 180 in the side rail 110. The access hole 180 is smaller in diameter than the head of the main fastener 140, but is sized large enough to allow access with a tool T for tightening and loosening the main fastener 140.

In the illustrated embodiments, the main fastener 140 includes a "TORX®" type "T40" sized female head. TORX® is generically described as a "hexalobular internal" pattern by standardization organizations. In this case, the OEM mounting fasteners for the hardtop of the JEEP® JK-series Wrangler utilize TORX® size T40 fasteners. As a result, the main fasteners 140 of the system of the present disclosure can be tightened or loosened using the same tool T as the tool used for tightening or loosening the OEM hardtop mounting fasteners, enhancing the convenience to the user during installation and removal of the assembled combination 100. In other embodiments, the main fastener 140 is any suitable fastener type and size to withstand the designated loads of the roof rack system 102.

Embodiments of a method of assembly of a roof rack system for a vehicle hardtop, such as assembling the roof rack system 102 to the vehicle hardtop 200, resulting in the assembled combination 100 of FIG. 1, will now be described with reference to FIGS. 5 and 6. In one embodiment, the front mount assembly 192, as shown as an exploded view in FIG. 5, is assembled to the vehicle hardtop 200. As an illustrative example, the front mount assembly 192 is described in more detail below; however, additional front mount assemblies 192 and rear mount assemblies 194 are similar in method of assembly, and are omitted for clarity.

First, the t-nuts 156 are inserted in the lower t-slot 176 of the side rail 110. The main fastener 140 is combined with the o-ring 154 and inserted into the cavity 190 of the front upper mounting pad 112.

Next, the side rail 110 is placed in contact with the front upper mounting pad 112 and aligned with the front upper mounting pad 112 such that each t-nut 156 aligns with one of the countersunk mounting pad holes 172. In the illustrated embodiment, two t-nuts 156 are used to interface two countersunk mounting pad holes 172. The washer 152 and the o-ring 154 are placed between the t-nuts 156 in the lower t-slot 176 and the front upper mounting pad 112.

The upper sealing pad 126 is then placed below the front upper mounting pad 112 and aligned with the axes of the countersunk mounting pad holes 172. In this regard, the main fastener 140 is inserted through the upper sealing pad 126 during assembly. The upper sealing pad 126 directly interfaces and contacts the upper surface of the vehicle hardtop 200, as shown most clearly in FIG. 6. Likewise, the forward sealing pad 196 is placed between the front upper mounting pad 112 and the upper surface of the vehicle hardtop 200. The forward sealing pad 196 is aligned with the axis of the hole in the elevated boss 168.

Below the vehicle hardtop 200, the front lower mounting pad 116 is positioned to interface the lower sealing pad 128, which interfaces and contacts the lower surface of the vehicle hardtop 200. The lower sealing pad is aligned with the axes of the countersunk mounting pad holes 172.

Having now aligned each component, the lower pad fasteners 150 are combined with the washers 152 and the o-rings 154 and inserted from the bottom through the front lower mounting pad 116, the lower sealing pad 128, the vehicle hardtop 200, the upper sealing pad 126, the front upper mounting pad 112, and into the t-nuts 156 within the lower t-slot 176 of the side rail 110, where the lower pad fasteners 150 are secured. In the illustrated embodiment, two lower pad fasteners 150 are shown; however, in other embodiments any number of lower pad fasteners 150 are used to secure the components of the front mount assembly 192.

Continuing with the assembly, the upper t-nut 146 is inserted into the upper t-slot 174. The front cap 120 is now placed in contact with the front upper mounting pad 112, aligning the corresponding edges. The countersunk hole 170 of the front cap 120 is aligned with the upper t-nut 146 as the front cap 120 is placed in contact with an upper surface of the side rail 110. The cap fastener 144 is inserted through the countersunk hole 170 of the front cap 120 and secured to the upper t-nut 146.

Next, below the vehicle hardtop 200, the forward cap fastener 166 is combined with the washer 152 and o-ring 154 and inserted from the bottom through the vehicle hardtop 200, the forward sealing pad 196, the elevated boss 168 of the front upper mounting pad 112, and into the front cap 120, where the forward cap fastener 166 is secured.

Having now captured the main fastener 140 within the cavity 190, the main fastener has been inserted through the front upper mounting pad 112, the upper sealing pad 126, the vehicle hardtop 200, the lower sealing pad 128, and the front lower mounting pad 116. To secure the main fastener 140 to the vehicle space frame 300, the nut plate 148 is coupled to the forward left bracket 132 and receives the main fastener 140 upon assembly of the assembled combination 100 to the vehicle space frame 300, thereby securing the main fastener 140.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claims are defined as follows:

1. A cargo carrier for a vehicle having a removable hardtop and a space frame, the cargo carrier comprising:
   an elongate rail comprising an attachment point and an access hole;
   an upper mounting pad configured to interface the elongate rail at the attachment point and to interface an upper surface of the removable hardtop;
   a lower mounting pad configured to interface a lower surface of the removable hardtop;
   a bracket removably coupled to the space frame and configured to interface the lower mounting pad; and
   a fastener coupled to the upper mounting pad, the lower mounting pad, and the bracket,
   wherein the removable hardtop is positioned between the upper mounting pad and the lower mounting pad, and wherein the elongate rail is removably coupled to the upper mounting pad, to capture the fastener, the captured fastener being accessible through the access hole to selectively mount the cargo carrier to the vehicle.

2. The cargo carrier of claim 1, further comprising a crossbeam coupled to the elongate rail and configured to carry cargo.

3. The cargo carrier of claim 1, wherein the captured fastener is accessed with a tool through the access hole.

4. The cargo carrier of claim 1, further comprising a cap configured to cover the end of the elongate rail and the upper mounting pad, wherein the cap is coupled to the elongate rail.

5. The cargo carrier of claim 4, wherein the cap is coupled to the upper mounting pad.

6. The cargo carrier of claim 1, wherein the removable hardtop further includes a plurality of hardtop fasteners to couple the removable hardtop to the vehicle, each hardtop fastener having a tool interaction size, wherein the captured fastener is configured to have the tool interaction size of the plurality of hardtop fasteners such that a tool interchangeably interfaces both the captured fastener and the plurality of hardtop fasteners.

7. The cargo carrier of claim 1, wherein the bracket further comprises a nut plate configured to receive the fastener.

8. The cargo carrier of claim 1, further comprising a seal positioned between the upper mounting pad and the upper surface of the vehicle hardtop for preventing water intrusion.

9. The cargo carrier of claim 1, further comprising a seal positioned between the lower mounting pad and the lower surface of the vehicle hardtop for preventing water intrusion.

10. A roof rack system for a vehicle having a removable hardtop and a space frame, the roof rack system comprising:
   a first elongate rail positioned near a first edge of the removable hardtop, the first elongate rail comprising a first forward access hole, and a first rear access hole;
   a second elongate rail positioned near a second edge of the removable hardtop, the second elongate rail comprising a second forward access hole, and a second rear access hole;
   a first forward upper mounting pad and a first rear upper mounting pad configured to couple the first elongate rail in an elevated position relative to the removable hardtop;
   a second forward upper mounting pad and a second rear upper mounting pad configured to couple the second elongate rail in an elevated position relative to the removable hardtop;
   a first forward bracket and a first rear bracket removably coupled to the space frame, the first forward bracket and the first rear bracket configured to couple the first elongate rail to the vehicle space frame; and
   a second forward bracket and a second rear bracket removably coupled to the space frame, the second forward bracket and the second rear bracket configured to couple the second elongate rail to the vehicle space frame,
   wherein the first and second elongated rails, the first and second forward upper mounting pads, the first and second rear upper mounting pads, and the removable hardtop are configured to be removable from the vehicle as a unit without removing the first and second forward brackets and the first and second rear brackets from the vehicle, and wherein the access holes in the first elongate rail and the second elongate rail allow access to a captured fastener for assembly and removal of the removable hardtop.

11. The roof rack system of claim 10, further comprising a crossbeam coupled to the first elongate rail and the second elongate rail, the crossbeam configured to carry cargo.

12. The roof rack system of claim 10, further comprising a forward cap and a rear cap configured to cover the ends of the first elongate rail.

13. The roof rack system of claim 10, further comprising a forward cap and a rear cap configured to cover the ends of the second elongate rail.

14. The roof rack system of claim 10, further comprising a first forward seal positioned between the first forward upper mounting pad and the upper surface of the vehicle hardtop, and a first rear seal positioned between the first rear upper mounting pad and the upper surface of the vehicle for preventing water intrusion.

15. The roof rack system of claim 10, further comprising a second forward seal positioned between the second forward upper mounting pad and the upper surface of the vehicle hardtop, and a second rear seal positioned between the second rear upper mounting pad and the upper surface of the vehicle for preventing water intrusion.

16. The roof rack system of claim 10, wherein the first elongate rail and the second elongate rail are parallel and positioned in the direction of straight vehicle travel.

17. A method of assembling a cargo carrier for a vehicle having a removable hardtop and a space frame, the method comprising:

obtaining an elongate rail having an attachment point, an upper mounting pad having a first alignment point, a main fastener, a lower mounting pad having a second alignment point, and a pad fastener;

inserting the main fastener in a cavity in the upper mounting pad;

positioning the attachment point of the elongate rail on the upper mounting pad in contact with an upper surface of the removable hardtop;

positioning the lower mounting pad in contact with a lower surface of the removable hardtop;

aligning the first alignment point with the second alignment point; and inserting the pad fastener through the lower mounting pad, the vehicle hardtop, the upper mounting pad, such that the pad fastener is coupled to the elongate rail, wherein, upon completing the steps, a head of the main fastener is captured between the elongate rail and the upper mounting pad.

18. The method of claim 17, comprising the further steps of:

coupling a bracket to the space frame;

aligning the vehicle hardtop on the space frame; and inserting the main fastener through a nut plate coupled to the bracket, such that the main fastener is coupled to the space frame, thereby coupling the cargo carrier and the removable hardtop to the vehicle.

19. The method of claim 17, comprising the further step of lifting the removable hardtop with a hoist attached to the elongate rail.

20. The method of claim 17, comprising the further step of obtaining a tool for rotating the main fastener, wherein the tool is sized to interface a hardtop fastener configured to couple the hardtop to the vehicle.

* * * * *